United States Patent
Robertson et al.

(10) Patent No.: US 10,410,534 B2
(45) Date of Patent: Sep. 10, 2019

(54) MODULAR SYSTEM FOR THE REAL TIME ASSESSMENT OF CRITICAL THINKING SKILLS

(71) Applicant: IS3D, LLC, Athens, GA (US)

(72) Inventors: Thomas P. Robertson, Athens, GA (US); Georgia W. Hodges, Covington, GA (US); David L. Ducrest, Athens, GA (US); Angela K. Brown, Athens, GA (US)

(73) Assignee: LAZEL, INC., Dallas, TX (US)

( * ) Notice: Subject to any disclaimer, the term of this patent is extended or adjusted under 35 U.S.C. 154(b) by 144 days.

(21) Appl. No.: 15/122,844

(22) PCT Filed: Mar. 2, 2015

(86) PCT No.: PCT/US2015/018246
§ 371 (c)(1),
(2) Date: Aug. 31, 2016

(87) PCT Pub. No.: WO2015/134358
PCT Pub. Date: Sep. 11, 2015

(65) Prior Publication Data
US 2017/0076622 A1    Mar. 16, 2017

Related U.S. Application Data

(60) Provisional application No. 61/947,192, filed on Mar. 3, 2014.

(51) Int. Cl.
*G09B 5/00* (2006.01)
*G09B 7/00* (2006.01)
(Continued)

(52) U.S. Cl.
CPC .............. *G09B 7/00* (2013.01); *G06Q 10/06* (2013.01); *G06Q 50/02* (2013.01); *G09B 7/02* (2013.01); *G09B 7/06* (2013.01); *G09B 19/00* (2013.01)

(58) Field of Classification Search
CPC . G09B 7/00; G09B 7/07; G09B 7/073; G09B 7/08
See application file for complete search history.

(56) References Cited

U.S. PATENT DOCUMENTS 5,957,699 A    9/1999  Peterson et al.
6,302,698 B1 *  10/2001  Ziv-El .................. G09B 7/02
                                                        434/322
(Continued)

FOREIGN PATENT DOCUMENTS

WO    2013040091 A1    3/2013

OTHER PUBLICATIONS

International Search Report for PCT/US2015/018246 dated Jun. 10, 2015.

*Primary Examiner* — Peter R Egloff
(74) *Attorney, Agent, or Firm* — Thomas | Horstemeyer LLP; Christopher B. Linder; Gregory James Mullin

(57) ABSTRACT

Disclosed are various embodiments for assisting students in a development of critical thinking skills pertinent to solving problems. An educational system may access predefined education modules from memory that facilitate an interaction between a student and a user interface. The user input provided by the student is measured in real-time such that an analysis platform may conduct a real-time evaluation of the user input. A heat map that visually depicts skills of the student is generated and may be rendered in an administrative user interface that may be accessed by a teacher or similar personnel.

18 Claims, 9 Drawing Sheets

| Student Users | Core Concepts | Data Analysis | Hypothesis | Predictions | Findings | Total |
|---|---|---|---|---|---|---|
| Student 1 | 7/10 | 8/10 | 6/10 | 7/10 | 4/10 | 32/50 |
| Student 2 | 9/10 | 7/10 | 10/10 | 9/10 | 7/10 | 42/50 |
| Student 3 | 5/10 | 3/10 | 2/10 | 5/10 | 3/10 | 18/50 |

(51) Int. Cl.
    *G06Q 10/06*     (2012.01)
    *G09B 7/02*     (2006.01)
    *G09B 7/06*     (2006.01)
    *G09B 19/00*     (2006.01)
    *G06Q 50/02*     (2012.01)

(56) References Cited

U.S. PATENT DOCUMENTS

| | | |
|---|---|---|
| 8,472,861 B2 | 6/2013 | Andreyev et al. |
| 8,491,311 B2 | 7/2013 | Bodner et al. |
| 2003/0031996 A1* | 2/2003 | Robinson ............... G09B 5/00 434/350 |
| 2009/0075246 A1 | 3/2009 | Stevens |
| 2010/0159438 A1* | 6/2010 | German ............ G06F 17/30525 434/433 |
| 2011/0171620 A1* | 7/2011 | Tzeng ...................... G09B 5/00 434/309 |
| 2013/0031015 A1 | 1/2013 | Schneider |
| 2013/0236875 A1 | 9/2013 | Hou et al. |
| 2014/0019461 A1 | 1/2014 | Bredenberg et al. |
| 2014/0242565 A1* | 8/2014 | Abts ....................... G09B 5/00 434/350 |
| 2015/0050625 A1* | 2/2015 | Stein ....................... G09B 5/14 434/169 |
| 2015/0050637 A1* | 2/2015 | James-Hatter ........... G09B 7/02 434/362 |

\* cited by examiner

| | Student Users | Core Concepts | Data Analysis | Hypothesis | Predictions | Findings | Total |
|---|---|---|---|---|---|---|---|
| 103a → | Student 1 | 7/10 | 8/10 | 6/10 | 7/10 | 4/10 | 32/50 |
| 103b → | Student 2 | 9/10 | 7/10 | 10/10 | 9/10 | 7/10 | 42/50 |
| 103c → | Student 3 | 5/10 | 3/10 | 2/10 | 5/10 | 3/10 | 18/50 |

| Evaluation and Recommendation of Student Data | | | |
|---|---|---|---|
| ◄ Prev \| Next ► | Sort by: Student ● Question ○ | | |
| Student 2 | Answer | Score | Comments |
| Module 1 Question 1 | Molecules are diffusing out of the vessel and into the brain matrix because of the concentration difference between the blood and the matrix. | 3/3 | Very good answer, well thought out and well written – excellent! |
| Module 1 Question 2 | The concentration of sodium is higher out of the vessel causing water to move into the matrix | 2/3 | Would have been 3 points, but you did not mention the free water concentration, which is why the water is diffusing. |
| Module 1 Question 3 | Based on the low concentration of salt in the blood, we should give the calf hypertonic saline to remove water from the brain. | 3/3 | Very good answer, interpreting your data to recommend a solution. |
| Total Score and Final Comments | | 8/9 | Great overall score and understanding, move on to module 2. |
| Recommendation | | Move on to module 2 | |

306b — Student 2 (row label)
303b — table outline
315b — Move on to module 2

FIG. 3B

MODULAR SYSTEM FOR THE REAL TIME ASSESSMENT OF CRITICAL THINKING SKILLS

CROSS-REFERENCE TO RELATED APPLICATION

This application is the 35 U.S.C. § 371 national stage application of PCT Application No. PCT/US2015/018246, filed Mar. 2, 2015, where the PCT claims priority to and the benefit of, U.S. Provisional Application No. 61/947,192, filed Mar. 3, 2014, both of which are herein incorporated by reference in their entirety.

STATEMENT REGARDING FEDERALLY SPONSORED RESEARCH OR DEVELOPMENT

This invention was made with government support under grant number IIP-1430187 awarded by the National Science Foundation. The government has certain rights in the invention.

BACKGROUND

Education in fields such as science, technology, engineering, and math has been in a steady decline in the United States, resulting in the United States being ranked $28^{th}$ in science in the latest study by the Program for International Student Assessment. In addition, education remains problematic elsewhere throughout the world. Therefore, students need help in developing critical thinking skills to solve problems. School classrooms are currently dominated by textbooks that neither convey the dynamic nature of science, nor actively engage students to learn. However, in recent years, the technology infrastructure within schools has improved greatly. Unfortunately, it may be difficult to find technology that addresses the need to improve students' problem solving skills in their educational courses.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a pictorial diagram of an example heat map rendered by an administrator client device in the networked environment of FIG. 2 according to various embodiments of the present disclosure.

FIG. 3B is a pictorial diagram of an example user interface rendered by an administrative client in the networked environment of FIG. 2 according to various embodiments of the present disclosure.

DETAILED DESCRIPTION

Figure 2:
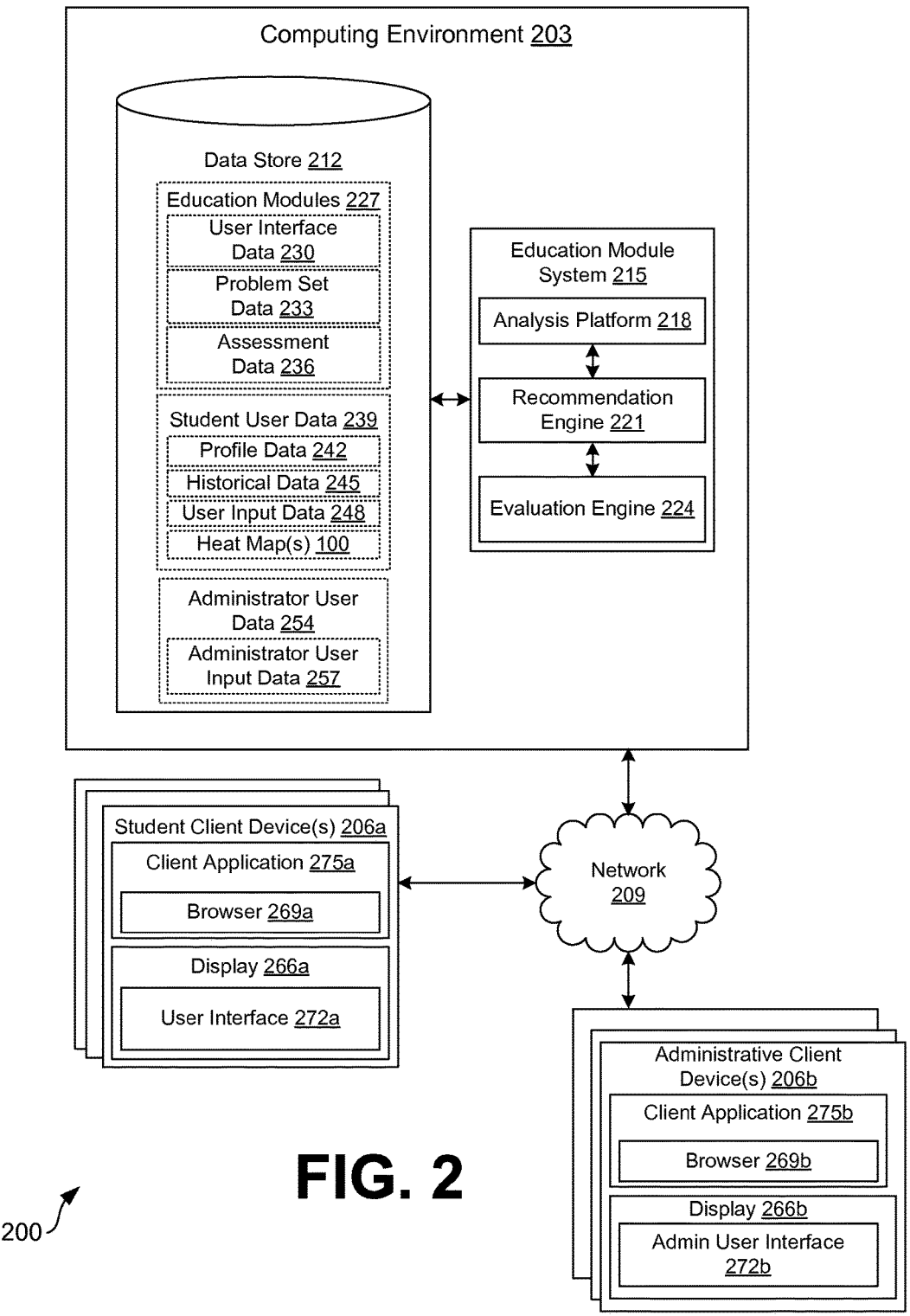
FIG. 2 is a drawing of a networked environment according to various embodiments of the present disclosure.

It is difficult for students to acquire essential problem solving and critical thinking skills in countless areas of the world with varying degrees of technology capabilities. Therefore, students need assistance in developing critical thinking skills to solve analytical problems, such as scientific problems. Traditionally, school classrooms have predominantly relied on textbooks that neither convey the dynamic nature of science, nor actively engage students to learn. Although in recent years, the technology infrastructure within schools throughout the world has vastly improved, finding technology that both meets the purchasing criteria for schools and addresses the need of improving students' problem solving skills in science classes remains problematic.

Accordingly, it is beneficial to employ educational modules that are configured to facilitate an interaction with one or more students. Educational modules may comprise, for example, tutorials, interactive training modules, etc. that may be employed to facilitate the development of one or more quantifiable skills in a student. Thus, students may access computing devices, such as laptops, desktop computers, or smart devices (e.g., tablet computers, smartphones) to interact with user interfaces sent by an education module system that facilitates a real-time evaluation of the students' performances and progression through an education module. As may be appreciated, it may be beneficial for an administrator, such as a teacher, to access the evaluation of the student's progression and performance in real-time or near real-time. According to various embodiments, this may be accomplished by measuring an interaction between a computing device and a student user of the computing device as user input data, and sending the user input data to the education module system as the student user progresses through an education module.

Further, it may be beneficial to employ an analysis platform to quantify the performance and progression of the student respective of a particular education module and/or skills the education module is employed to develop. Accordingly, the user input data may be sent to an analysis platform to generate a plurality of metrics associated with the skills that the education module is employed to develop in the student. A visualization region of a user interface comprising a visual depiction of a performance and/or progress of one or more students through one or more education modules may assist an administrator in quickly identifying strengths and weaknesses of a particular student or a group of students. According to various embodiments, such a visualization region may comprise a dynamically generated heat map depicting the plurality of skills of the student users as a structured visual document, which may allow an administrator to quickly identify the strengths and weaknesses of a student user in real-time or near real-time. As may be appreciated, the administrator may then provide evaluations and recommendations to the student user with respect to taking a subsequent action, such as a remedial action, employed to further assist the student in strengthening the development of a weak skill. In the following discussion, a general description of the education module system and its components is provided, followed by a discussion of the operation of the same.

In reference to FIG. 1, shown is a heat map 100, which visually depicts a plurality of skills for each student user 103, for example, student 1 103a, student 2, 103b, and student 3 103c. Each of the plurality of skills comprises metrics for each student user 103, which are visually depicted in a respective region of the heat map 100 by a respective pattern 106 corresponding to how a student user 103 performed with respect to one of the skills. As may be appreciated, by associating the metrics for each student with a pattern 106, a teacher is able to quickly view which areas are problem areas for the student users 103. To this end, a teacher may see that he or she needs to give extra attention to a particular student user 103, or give extra attention to a group of student users 103 with respect to a particular one of the skills.

With reference to FIG. 2, shown is a networked environment 200 according to various embodiments. The networked environment 200 includes a computing environment 203, a student client device 206a, and an administrator client device 206b, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203 include, for example, an analysis platform 218, a recommendation engine 221, an evaluation engine 224, and other applications, services, processes, systems, engines, or functionality not discussed herein. The analysis platform 218 is executed to receive measureable and quantifiable interactions between a student and a user interface corresponding to an education module 227. The interactions may be measured as user input data 248, which may be sorted to generate metrics for skills the education module 227 is employed to develop, such as analytical skills, problem solving skills, etc. Accordingly, the analysis platform 218 may be configured to generate a plurality of metrics for each of a plurality of skills corresponding to the student user 103 (FIG. 1) and the education module 227 employed, describing, for example, the student user's 103 development of a respective one of the skills over time. According to various embodiments, each of the plurality of metrics may be encoded in a heat map 100, wherein each of the metrics corresponds to a respective portion of the heat map 100, as will be discussed in greater detail below with respect to FIG. 6.

The recommendation engine 221 is executed to provide a recommendation to a student user 103 and/or an administrator with respect to a subsequent action that a student user 103 is recommended to take in the education module system 215. For example, if a student user 103 performs weakly with respect to a development of a particular skill, a subsequent education module 227 may be recommended to further develop the particular skill. The recommendation may be determined according to the plurality of metrics. According to various embodiments, the recommendation may be generated by the recommendation engine 221 and may be partially or exclusively generated according to administrator user input data 257. The evaluation engine 224 is executed to provide an evaluation to a student user 103 upon the completion of an education module 227. Accordingly to various embodiments, the evaluation is determined according to the user input data 248. The evaluation may comprise, for example, a score that a student user 103 receives upon completion of an education module 227, a percentage of problems that a student user 103 answers correctly, comments made by an administrator, and/or a graphic representation of the problems in an education module 227 that a student user 103 answers correctly and incorrectly. In one embodiment, the evaluation is exclusively based on an administrator's comments. According to various embodiments, the evaluation may be determined utilizing metrics determined by the analysis platform 218.

The data stored in the data store 212 includes, for example, education modules 227, student user data 239, administrator user data 254, and potentially other data. Education modules 227 may comprise, for example, programs, tutorials, and/or interactive modules that may be created by various administrators to facilitate the development of a particular skill. For example, an educational module 227 may assist a medical student to diagnose a patient who has kidney failure secondary to type II diabetes. Similarly, an education module 227 may assist an EMT to treat a person who has been exposed to chlorine gas following a train wreck. Thus, an education module 227 may comprise data employed to present a user with the interactive program such as user interface data 230, problem set data 233, assessment data 236, and potentially other data. The user interface data 230 may comprise, for example, graphics, links, hyperlinks, inputs, outputs, images, etc. that may be employed to train a user to develop a particular skill and/or measure an ability of the user to develop and retain the particular skill. The problem set data 233 may comprise, for example, multiple choice questions, fill-in-the-blank questions, essay questions, compiling a correct sequence of events questions, videos, images, graphics, etc. that assist in measuring the interaction between the user and the education module 227. The assessment data 236 may comprise, for example, a rubric for evaluating a student user 103. For example, if the education module 227 is designed to assist a medical student in diagnosing a patient's kidney failure, the assessment data 236 may comprise a rubric that has questions such as, "Did the medical student correctly identify the patient's symptoms?" The assessment data 236 may also include an exemplary response to the question that includes all of the relevant information, critical thinking and concepts. The assessment data 236 may also include a suggested scoring system to aid a teacher and/or administrator in assessing the student's responses. The student user data 239 comprises, for example, profile data 242, historical data 245, user input data 248, heat map(s) 100, and potentially other data. The profile data 242 may comprise, for example, information related to the student user 103, such as a password, passcode, or other means of authentication and/or identification. For example, the profile data 242 of a student named "John Smith" may indicate that John Smith's password is "JSmith." The historical data 245 may comprise, for example, the number of education modules 227 that the student user 103 has completed, the percentage of questions that the student user 103 has answered correctly, and/or the number or times that the student user 103 has failed to complete an education module 227. For example, the historical data 245 of a model student user 103 may indicate that the model student user 103 has completed ten education modules 227 and has answered an average of 98 percent of the questions correctly. The user input data 248 may comprise answers given by a student user to questions whether open-ended, multiple choice, fill in the blank, etc. According to various embodiments, the user input data 248 may be received in real-time by measuring the interaction between the student user 103 and the user interface 272a utilizing, for example, components of a user interface. For example, the user may input data via the user interface 272a utilizing a keyboard, a mouse click, a body gesture, and/or a voice command, and the user input data 248 may be received by the education module system 215 in near real-time. The education module system 215 may also include the facility for a teacher to message a student user 103, or a group of students to guide the student(s). For example, a teacher may be able to view response data from his or her student(s) and then send a hint or guidance to the student that appears as a message within the module being used by the student(s) in near real-time. The heat map(s) 100 may comprise, for example, a table or similar component for displaying students' abilities to perform an education module 227. According to various embodiments, the heat map 100 may be generated and presented to an administrator to assist the administrator in evaluating students' abilities to perform an education module 227. According to various embodiments, the heat map 100 may be configured to assist the administrator in providing a recommendation for generating a second education module 227.

The administrator user data 254 may comprise, for example, administrator user input data 257 and potentially other data. The administrator user input data 257 may comprise, for example, comments for evaluating an answer to a question given by a student user 103. According to various embodiments, the administrator user input data 257 may comprise, for example, a recommendation and/or a passcode for the student user 103 to access another education module 227.

The student client device(s) 206a and/or the administrative client device(s) 206b are representative of a plurality of client devices that may be coupled to the network 209. The student client device(s) 206a and/or the administrative client device(s) 206b may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The student client device(s) 206a and administrative client device(s) 206b may include a display 266a and 266b, respectively. The displays 266a and 266b may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The student client device(s) 206a and administrative client device(s) 206b may be configured to execute various applications such as a client application 275a and 275b respectively, and/or other applications. The client applications 275a and 275b may be executed in the student client device(s) 206a and/or the administrative client device(s) 206b, for example, to access network content served up by the computing environment 203 and/or other servers, thereby rendering a user interface 272a and 272b on the display 266a and/or 266b respectively. To this end, the client applications 275a and 275b may comprise, for example, a browser 269a and/or 269b, a dedicated application, etc., and the user interfaces 272a and 272b may comprise a network page, an application screen, etc. The student client device(s) 206a and/or the administrative client device(s) 206b may be configured to execute applications beyond the client applications 275a and 275b such as, for example, email applications, social networking applications, word processors, spreadsheets, and/or other applications.

Next, a general description of the operation of the various components of the networked environment 200 is provided. To begin, it is assumed that the computing environment 203, the student client device(s) 206a, and the administrative client device(s) 206b are in data communication through the network 209. First, an education module 227 is accessed from memory in response to a user request that, for example, is received from a student client device 206a (e.g., the user selects a particular education module 227) or from the administrator client device 206b (e.g., a teacher selects a particular education module 227 for a student to perform). As discussed above, the education module 227 may be configured to assist a student user 103 in the development of the various skills that are required to solve problems (e.g., data analysis, forming and testing a hypothesis, etc.) Thus, the education module 227 may comprise, for example, graphics, user interface data 230, problem set data 233, and/or assessment data 236 that may be presented to and/or obtained from a user. Then, the education module system 215 uses the accessed education module 227 to serve up a user interface 272a that may be presented to the student user 103 to facilitate completion of the education module 227.

Figure 4:
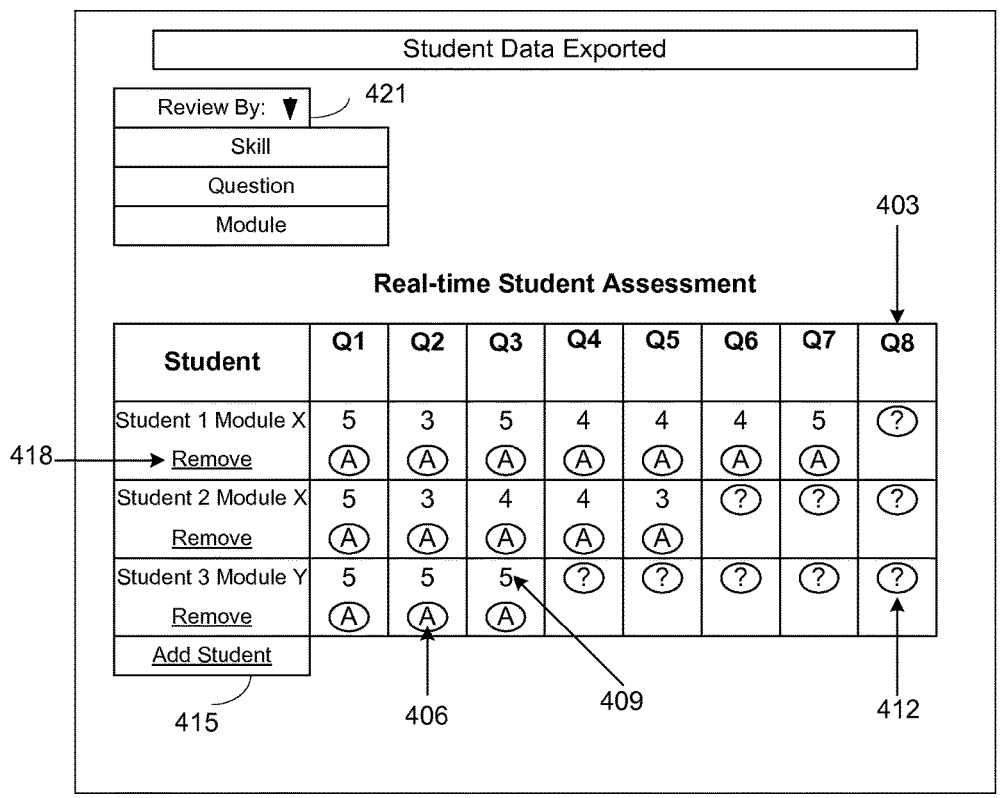
FIG. 4 is a pictorial diagram of an example user interface rendered by an administrative client in the networked environment of FIG. 2 according to various embodiments of the present disclosure.

Next, the education module system 215 may receive user input data 248 measured from the student client device 206a according to an interaction between the student user 103 and the user interface 272a. For example, a surgeon may be asked to locate particular parts of the human body by being prompted with a body part and asked to type a name of the body part. The interaction with the user interface 272*a*, such as between the student user 103 and the mouse or the student user 103 and the keyboard, the time to answer the question, the correct or incorrect nature of the answer, etc., may be measured as user input data 248. Thus, according to various embodiments, the user input data 248 may be received in real-time by measuring the interaction between the student user 103 and the user interface 272*a*. The education module system 215 may then send the user input data 248 to the administrative client device 206*b* to be rendered in an administrative user interface 272*b*, so that the administrator can immediately view and evaluate the user input data 248 to determine, for example, how a student user 103 is performing on an education module 227. According to various embodiments, the administrative user interface 272*b* may be configured to switch among the user interfaces 272*a* so that the administrator can view the user input data 248 for multiple student users 103 in real-time and provide real-time feedback to student users 103. Alternatively, the user input data 248 for multiple users may be encoded in a single administrative user interface 272*b* as shown in FIG. 4.

Next, the education module system 215 generates a plurality of metrics describing a student user's 103 performance and/or a progression respective to one or more particular skills that the education module 227 is employed to develop over time. According to various embodiments, the metrics may be determined according to the user input data 248. For example, one of the metrics may describe an amount of time a student user 103 spends on an education module 227. Additionally, metrics may, for example, compare an answer of a student user 103 to a model answer, compare a student user's 103 score to a predefined threshold, and/or describe a student user's 103 level of understanding of a concept and/or an education module 227. In various embodiments, each of the plurality of metrics may be weighted differently according to administrator user input data 257.

Next, an analysis platform 218 may generate a heat map 100 configured to assist an administrator in assessing students' development of one or more skills over time. A heat map 100 may comprise, for example, a table or similar component for displaying students' abilities to perform an education module 227. According to various embodiments, the heat map 100 may be configured to assist the administrator in providing a recommendation for accessing a second education module 227. The heat map 100 may then be sent to the administrative client device 206*b* for display in the administrative user interface 272*b*. By viewing the heat map 100 which has metrics describing skills that the performed education module 227 is employed to develop, the administrator can quickly identify both strengths and weaknesses of each student user 103 in real-time. Accordingly, an evaluation based on the heat map 100 may be generated in the education module system 215 via an evaluation engine 224. The evaluation may comprise, for example, a score that a student user 103 receives upon completion of an education module 227, a percentage of problems that a user answers correctly, or a graphic representation of the problems in an education module 227 that a student user 103 answers correctly and incorrectly. According to various embodiments, the evaluation may comprise comments made by an administrator.

Next, a recommendation for accessing a second education module 227 may be generated in the education module system 215 via a recommendation engine 221. The recommendation may be determined according to the plurality of metrics and/or may be partially or exclusively determined according to administrator user input data 257. The recommendation may comprise, for example, remedial actions for a student user 103 to take that may improve the student user's 103 performance on an education module 227 or improve the student user's 103 development of one or more skills such as accessing another education module 227. The recommendation may be authorized by an administrator by sending the recommendation to the student client device 206*a*. According to various embodiments, the recommendation may be based on a rubric, a curriculum, etc. provided by, for example, the administrator. The recommendation may also comprise, for example, actions such as accessing a second education module 227 that may suggest that the student user's 103 performance on a previous education module 227 and/or development of a skill was satisfactory. The recommendation may be sent to the student client device 206*a* and/or the administrative client device 206*b* to be rendered in a user interface 272*a* or 272*b*. In additional embodiments, the recommendation may be sent, for example, via a message such as a SMS message, voice message, or email message.

Figure 3A:
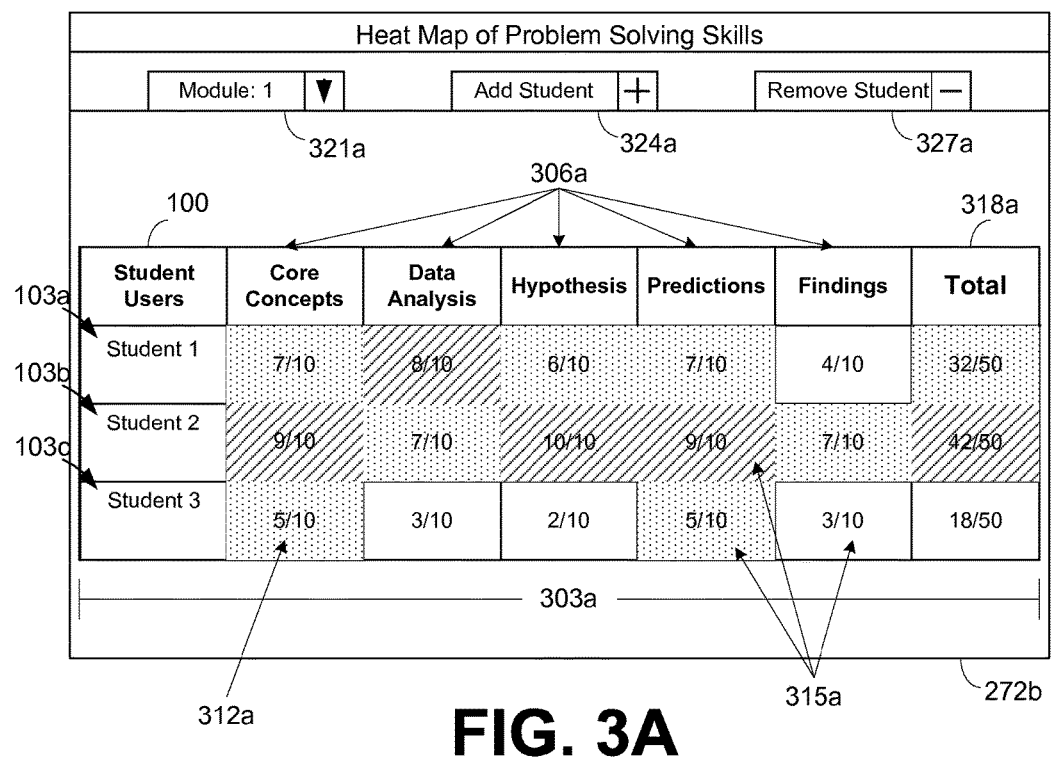
FIG. 3A is a pictorial diagram of an example user interface rendered by an administrative client in the networked environment of FIG. 2 according to various embodiments of the present disclosure.

Referring next to FIG. 3A, shown is an example of an administrative user interface 272*b* executed in the administrative client device 206*b* (FIG. 2) in the networked environment 200 of FIG. 2 according to various embodiments. In the non-limiting example of FIG. 3A, shown is an administrative user interface 272*b* comprising a heat map 100 (FIG. 1) that depicts metrics for each of a plurality of skills for displaying students' abilities to perform an education module 227 (FIG. 2).

In this non-limiting example, a rendering of a table 303*a* depicts the plurality of metrics 312*a* and 315*a* for each of the plurality of skills 306*a* corresponding to each student user 103 that is performing the education module 227. As may be appreciated, the plurality of skills 306*a* may be described by a metric 312*a* that comprises a score or percentage that the student user 103 has attained with respect to questions pertaining to a respective skill. Metrics 312*a* or 315*b* may comprise, for example, a number corresponding to a score or percentage on a problem, an amount of time that a student user 103 takes to complete a problem or education module 227, etc. According to various embodiments, the areas of the heat map 100 corresponding to respective ones of the plurality of skills 306*a* may be associated with a pattern, a color, a shape, a visual identifier, etc., according to whether the corresponding metric 315*a* meets a predefined threshold.

As a non-limiting example, in the event a metric 312*a* or 315*a* comprises a percentage, if the metric 312*a* or 315*a* exceeds a 90% predefined threshold, the corresponding area in the heat map 100 for the metric 312*a* or 315*a* may be associated with a green color. To this end, the green color may facilitate a cursory inspection of the heat map 100 by an administrator to quickly determine whether the student is performing well in the corresponding skill. Similarly, if the metric 312*a* or 315*a* falls between the 90% predefined threshold and a 65% predefined threshold, the corresponding area in the heat map 100 for the metric 312*a* or 315*a* may be associated with a yellow color indicating that the student's performance may be questionable. If the metric 312*a* or 315*a* falls between a 0% predefined threshold and the 65% predefined threshold, the corresponding area in the heat map 100 for the metric may be associated with a red color indicating that the student's performance may be unsatisfactory.

As described above, a metric 318*a* describing a total score or percentage of a student 309*a* is depicted by a region of the table 303a. As may be appreciated, the metric 318a describing the total score or percentage allows an administrator to quickly view and evaluate the overall performance of a student 309a with respect to a particular education module 227.

As may be appreciated, the administrative user interface 272b may be configured to access one or more heat maps 100 corresponding to a plurality of education modules 227 by engaging a module tab 321a. The add student tab 324a allows an administrator to add student users 103 to the heat map 100 in order to view metrics for the plurality of skills corresponding to multiple student users 103 in the heat map 100. The remove student tab 327a allows an administrator to remove student users 103 from the heat map 100. As may be appreciated, the add student tab 324a and remove student tab 327a allow an administrator to focus on one student user's 103 performance of an education module 227 as well as compare the performances of multiple student users 103 on an education module 227. According to various embodiments, adding and removing a student user 103 from the user interface 272b may be accomplished by employing Asynchronous JavaScript and Extensible Markup Language (AJAX), or similar technologies, which may conduct "back-end" calls from the student client device 206a (FIG. 2) to the computing environment 203, without requiring a refreshing of the user interface 272b by the user. Accordingly, the user interface 272b may be implemented in an asynchronous web application, such as a web application employed utilizing a browser, as described above in FIG. 2.

Turning now to FIG. 3B, shown is an example of an administrative user interface 272b in the display 266b (FIG. 2) executed in the administrative client device 206b (FIG. 2) in the networked environment 200 of FIG. 2 according to various embodiments. In the non-limiting example of FIG. 3, shown is an administrative user interface 272b that allows an administrator to provide an evaluation of user input data 248 and a recommendation for the student user to take a subsequent action based on the evaluation.

In this non-limiting example of FIG. 3B, the administrator user interface 272b comprises exemplary comments 303b that may be made by an administrator with respect to the answer 306b given by the student and the score 318b received on the respective question. As may be appreciated, the user input data 248 (FIG. 2) may be sorted 312b according to the user input data 248 corresponding to a student user 103 (FIG. 1). Accordingly, an administrative user interface 272b may be configured to display the user input data 248 corresponding to one student user 103, so that the administrator may make a recommendation 315b for the one student user 103. Alternatively, the user input data 248 may be sorted 312b according to the user input data 248 corresponding to a question.

Accordingly, an administrative user interface 272b may be configured to display the user input data 248 of multiple student users 103 that corresponds to one question. Thus, the administrator may make a recommendation 315b based on the answers 306b given to one particular question by multiple student users 103, and be able to view how difficult one particular question was for multiple student users 103. As may be appreciated, the administrative user interface 272b may be configured to allow the administrator to view previous and next 309b student data. As may be appreciated, the previous and next 309b feature may allow an administrator to easily compare the performances of multiple student users 103.

Moving on to FIG. 4, shown is an example of an administrative user interface 272b in the display 266b (FIG. 2) executed in the administrative client device 206b (FIG. 2) in the networked environment 200 of FIG. 2 according to various embodiments. In this non-limiting example, the administrative user interface 272b shows user input data 248 (FIG. 2) corresponding to answers to questions that have been sent to the administrative client device 206b and rendered in the administrative user interface 272b in real-time.

In the non-limiting example of FIG. 4, an administrator may view which questions 403 each student user 103 has completed in a respective education module 227 (FIG. 2). Accordingly, the administrator user interface 272b allows an administrator to view the real-time progress of multiple student users 103 working on the same education module 227, as shown in this example with respect to student 1 and student 2. According to various embodiments, the user interface 272b may be configured to show the score 409 received on a question 403. To this end, an administrator may be able to quickly gauge how well a student user 103 performed on a question 403. According to various embodiments, the administrative user interface 272b may be configured to allow the administrator to view an answer 406 given by a student user 103 to a question 403 before the student user 103 has completed an education module 227 by selecting an answer 406. As may be appreciated, the answer 406 feature allows an administrator to quickly view a student user's 103 answer 406 to a question 403. According to various embodiments, the administrative user interface 272b may be configured to allow an administrator to view the content 412 of a question 403. As may be appreciated, by viewing the content 412, the administrator may be able to quickly tell what skills are being evaluated by the question 403.

According to various embodiments, the administrative user interface 272b may be configured to allow the administrator to review 421 the student data according to the skill being practiced, the question 403 being answered, or the education module 227 being performed. To this end, an administrator may be able to quickly gauge how difficult an education module 227 is for multiple student users 103 and how well multiple student users 103 are performing with respect to a particular skill and/or question 403. According to various embodiments, the administrative user interface 272b may be configured to allow an administrator to add 415 a student or remove 418 a student. As may be appreciated, the add 415 and remove 418 features allow an administrator to view the user input data 248 for multiple student users 103.

To this end, an administrator may easily compare multiple student users 103 performing the same education module 227, the same question 403, or answering questions 403 that are related to a same skill. According to various embodiments, adding 415 and removing 418 a student user 103 from the user interface 272b may be accomplished by employing Asynchronous JavaScript and Extensible Markup Language (AJAX), or similar technologies, which may conduct "back-end" calls to the computing environment 203 (FIG. 2) without requiring a refreshing of the user interface 272b by the user. Accordingly, the user interface 272b may be implemented in an asynchronous web application, such as a web application employed utilizing a browser, as described above in FIG. 2.

Figure 5:
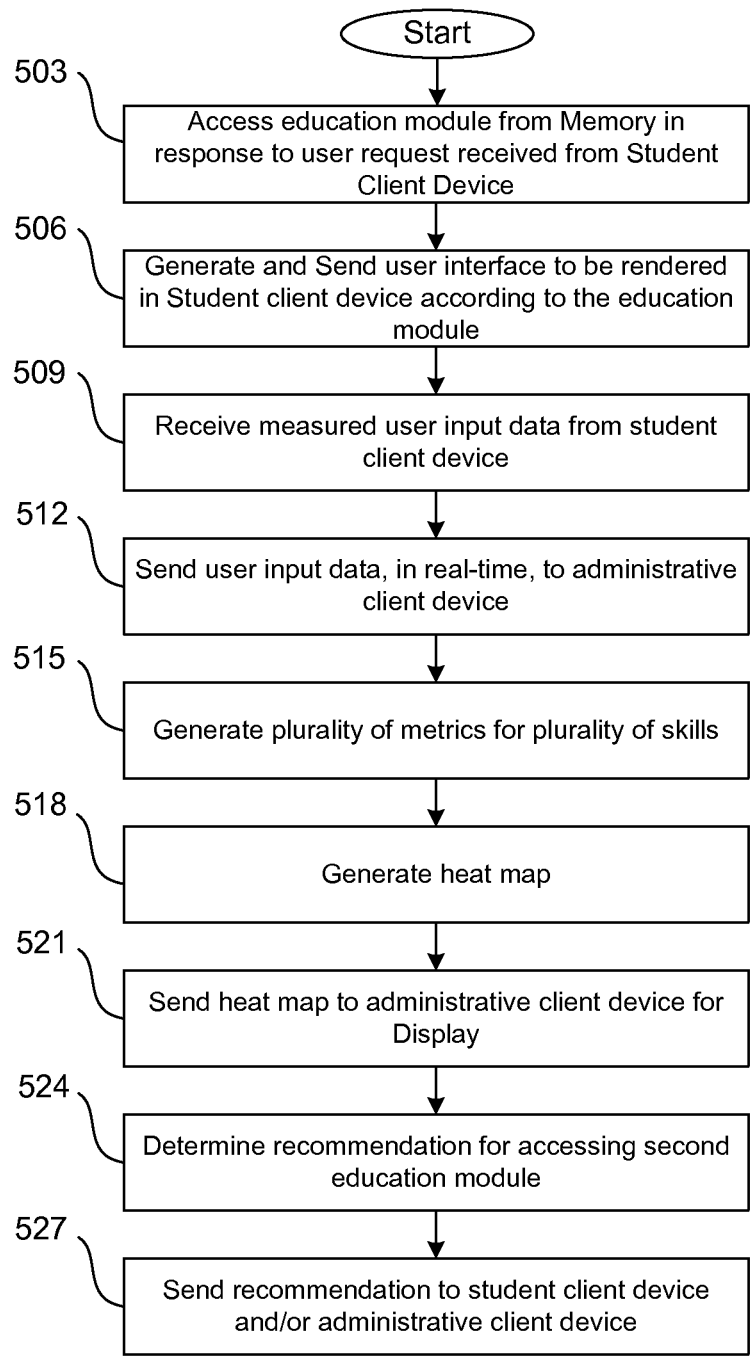
FIG. 5 is a flowchart illustrating one example of functionality implemented as portions of Education Module System executed in a computing environment in the networked environment of FIG. 2 according to various embodiments of the present disclosure.

Referring next to FIG. 5, shown is a flowchart that provides one example of the operation of a portion of the education module system 215 (FIG. 2) according to various embodiments. It is understood that the flowchart of FIG. 5 provides merely an example of the many different types of functional arrangements that may be employed to implement the operation of the portion of the education module system 215 as described herein. As an alternative, the flowchart of FIG. 5 may be viewed as depicting an example of elements of a method implemented in the computing environment 203 (FIG. 2), according to one or more embodiments.

Beginning with 503, an education module 227 (FIG. 2) is accessed from memory in response to a user request that, for example, is received from a student client device 206a (FIG. 2). As may be appreciated, an education module 227 may be configured to assist the student user 103 (FIG. 1) in the development of a skill, such as a problem solving skill. Thus, the education module 227 may comprise, for example, graphics, user interface data 230 (FIG. 2), problem set data 233 (FIG. 2), and/or assessment data 236 (FIG. 2). In addition, the education module 227 may be employed to assist a teacher in assessing students' development of a skill. Accordingly, in 506, the education module system 215 uses the education module 227 accessed in 503 to serve up a user interface 272a (FIG. 2) that may be presented to a user of a student client device 206a to facilitate completion of the education module 227.

In 509, the education module system 215 may receive user input data 248 (FIG. 2) measured from the student client device 206a according to an interaction between the user and the user interface 272a. The user input data 248 may comprise, for example, answers given by the student user 103 to questions whether open-ended, multiple choice, fill in the blank, etc. According to various embodiments, the user input data 248 may be received in real-time by measuring the interaction between the student user 103 and the user interface 272a. For example, the student user 103 may input data via a keyboard, a mouse click, body gestures, or a voice command, and the user input data 248 may be received by the education module system 215 in near real-time.

Then, in 512, the education module system 215 may send the user input data 248 to the administrative client device 206b (FIG. 2) to be rendered in an administrative user interface 272b, so that the administrator can immediately view and evaluate the user input data 248 to determine, for example, how a student user 103 is performing on an education module 227. According to various embodiments, the administrative user interface 272b (FIG. 2) may be configured to switch among the user interfaces 272a so that the administrator can view the user input data 248 for a plurality of student users 103 in real-time and provide real-time feedback to student users 103. In an alternative embodiment, the user input data 248 for a plurality of users may be encoded in a single administrative user interface 272b as shown in FIG. 4.

Next, in 515, a plurality of metrics, describing, for example, a student's development of a respective skill over time may be generated by the computing environment 203. The plurality of metrics may be determined according to the user input data 248. For example, one of the plurality of metrics may describe an amount of time a student user 103 spends on an education module 227. Additionally, metrics may, for example, compare a student user's 103 answer to a model answer, compare a student user's 103 score to a predefined threshold, and/or describe a student user's 103 level of understanding of a concept and/or an education module 227. In various embodiments, each of the plurality of metrics may be weighted differently according to an administrator input. Each of the plurality of metrics may be encoded in a heat map 100, wherein each of the metrics corresponds to a respective portion of the heat map 100, which will be discussed in greater detail below with respect to FIG. 6.

Next, in 518, a heat map 100 (FIG. 1) may be generated that may be configured to assist an administrator in assessing students' development of one or more skills over time. A heat map 100 may comprise, for example, a table or similar component for displaying student users' 103 abilities to perform an education module 227. According to various embodiments, the heat map 100 may be configured to assist the administrator in evaluating students' abilities to perform an education module 227 as well as providing a recommendation for generating a second education module 227. Then, in 521, the heat map 100 may be sent to the administrative client device 206b (FIG. 2) for display in the administrative user interface 272b. As may be appreciated, by viewing the heat map 100 comprising metrics describing skills, the administrator can quickly identify both strengths and weaknesses of each student user 103 in real-time.

Next, in 524, a recommendation for accessing a second education module 227 may be generated in the education module system 215. The recommendation may be determined according to the plurality of metrics and/or may be partially or exclusively determined according to administrator user input data 257. The recommendation may comprise, for example, remedial actions for a student user 103 to take that may improve the student user's 103 performance on an education module 227 or improve the student user's 103 development of one or more skills, such as accessing another education module 227. The recommendation may be authorized by an administrator by sending the recommendation to the student client device 206a. According to various embodiments, the recommendation may be based on a curriculum provided by, for example, the administrator. The recommendation may comprise, for example, progressive actions such as accessing a second education module 227 that may suggest that the student user's 103 performance on a previous education module 227 and/or concept was satisfactory. Next, in 527, the recommendation may be sent to the student client device 206a and/or the administrative client device 206b to be rendered in a user interface 272a and/or 272b. In additional embodiments, the recommendation may be sent, for example, via a message such as a SMS message, voice message, or email message.

Figure 6:
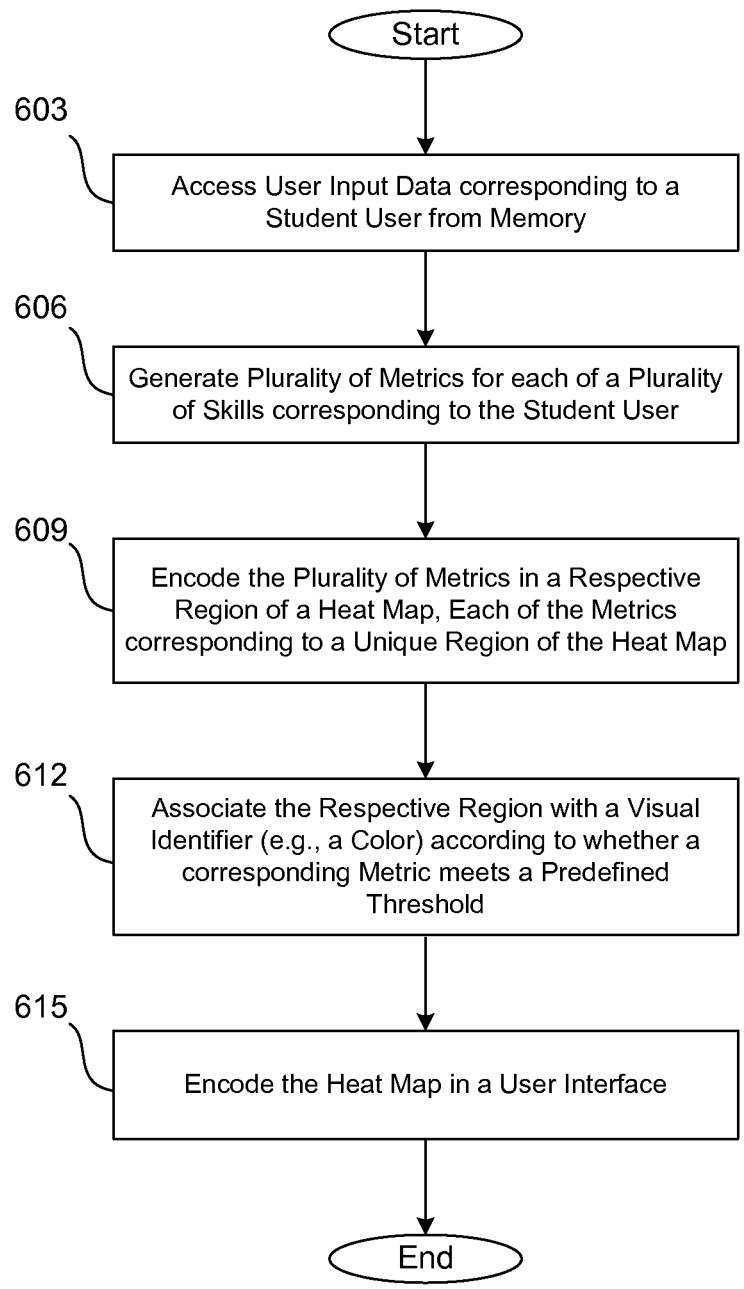
FIG. 6 is a flowchart of operations that may be performed to generate a heat map according to various embodiments of the present disclosure.

Referring next to FIG. 6, shown is a flowchart of operations that may be performed to generate a heat map 100 (FIG. 1) according to various embodiments. Beginning with 603, user input data 248 (FIG. 2), that may comprise, for example, answers to questions whether open-ended, multiple choice, fill in the blank, etc., corresponding to a student user 103 (FIG. 1) is accessed by the education module system 215 (FIG. 2) from memory. Then, in 606, a plurality of metrics for each of a plurality of skills corresponding to the student user 103, describing, for example, the student user's 103 development of a respective skill over time may be generated by the computing environment 203 (FIG. 2). The plurality of metrics may be determined according to the user input data 248. For example, one of the plurality of metrics may describe an amount of time the student user 103 spends on an education module 227 (FIG. 2). Additionally, metrics may, for example, compare a student user's 103 answer to a model answer, compare a student user's 103 score to a predefined threshold, and/or describe a student user's 103 level of understanding of a concept and/or an education module 227. In various embodiments, each of the plurality of metrics may be weighted differently according to an administrator input.

Next, in 609, each of the plurality of metrics may be encoded in a respective region of a heat map 100, wherein each of the metrics corresponds to a unique region of the heat map 100. According to various embodiments, a heat map 100 may be generated that may be configured to assist an administrator in assessing student users' 103 development of one or more skills over time. A heat map 100 may comprise, for example, a table or similar component for displaying students' abilities to perform an education module 227. According to various embodiments, the heat map 100 may be configured to assist the administrator in ranking student users 103 according to their abilities to perform an education module 227, so that the administrator may identify how each student user 103 is progressing in developing one or more skills. As may be appreciated, the heat map 100 may be configured to assist the administrator in evaluating students' abilities to perform an education module 227. Additionally, the heat map 100 may be configured to assist the administrator in providing a recommendation for generating a second education module 227.

Next, in 612, the respective regions of the heat map 100 may be associated with a visual identifier, such as color, patterns, or other ways to distinguish respective regions from each other, according to whether a corresponding metric meets a predefined threshold. According to various embodiments, the predefined threshold may be determined according to an administrator input or may be determined by the education module 227. According to various embodiments, the heat map 100 may be visually depicted as having respective portions of the heat map 100 that correspond to respective skills that are visually depicted by a color. The respective skills may be visually depicted by a color that is determined according to a performance of a student user 103 on an education module 227. As may be appreciated, the heat map 100 may be configured to display multiple students' user input data 248, so that an administrator can view the performances of each of the student users 103 on an education module 227. Alternatively, the heat map 100 may be configured to display students' performances on multiple education modules 227, so that the administrator can see a student's progression from one education module 227 to the next. Next, in 615, the heat map 100 may be encoded in a user interface 272b (FIG. 2) to be rendered in a display 266b on an administrative client device 206b.

Figure 7:
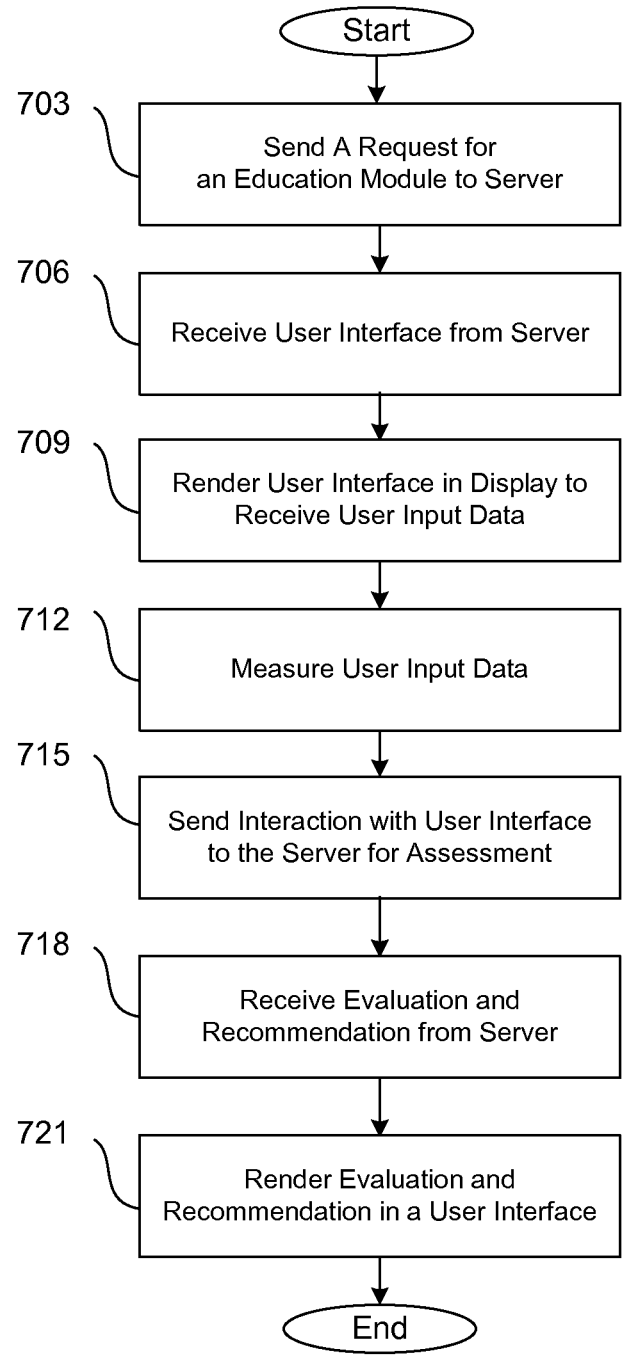
FIG. 7 is a flowchart illustrating one example of operations that may be performed by the student client devices in FIG. 2 in communication with the Education Module System executed in a computing environment in the networked environment of FIG. 2 according to various embodiments of the present disclosure.

Referring next to FIG. 7, shown is a flowchart that provides one example of operations that may be performed by a student client device 206a (FIG. 2) in communication with the education module system 215 (FIG. 2) over the network 209 (FIG. 2). It is understood that the flowchart of FIG. 7 provides merely an example of the many different types of functional arrangements that may be employed to implement the operations performed by the student client device 206a as described herein. As an alternative, the flowchart of FIG. 6 may be viewed as depicting an example of elements of a method implemented in the student client device 206a according to one or more embodiments.

Beginning in 703, the student client device 206a sends a request to the server for an education module 227 (FIG. 2). The request may be sent, for example, via SMS message, voice message, email message, or may comprise clicking on a link, hyperlink, visual representation of an education module 227, etc. According to various embodiments, the request may comprise a student user 103 authenticating his or her identity via a password, passcode, voice command, or via another means of authentication. Then, in 706, the student client device 206a receives a user interface 272a (FIG. 2.) for that student user 103 from the computing environment 203 (FIG. 2).

Next, in 709, the user interface 272a may be rendered in a display 266a (FIG. 2) of the student client device 206a to receive user input data 248, so that student users 103 (FIG. 1) can interact to complete the education module 227. Then, in 712, the user input data 248 is measured according to the interaction between the student user 103 and the user interface 272a. The user input data 248 may comprise, for example, answers to questions whether open-ended, multiple choice, fill in the blank, etc. The user may input data, for example, via a keyboard, a mouse click, body gestures or a voice command.

Next, in 715, the interaction between the student user 103 and the user interface 272a may be sent to the education module system 215 for assessment. The education module system 215 can subsequently generate a recommendation based on the user input data 248. According to various embodiments, the recommendation may comprise, for example, remedial actions for a student user 103 to take that may improve the student user's 103 performance on an education module 227 or improve the student user's 103 development of one or more skills such as accessing another education module 227. The recommendation may be authorized by an administrator by sending the recommendation to the student client device 206a. According to various embodiments, the recommendation may be based on a curriculum provided by, for example, the administrator. Additionally, the recommendation may comprise, for example, progressive actions such as accessing a second education module 227 that may suggest that the student user's 103 performance on a previous education module 227 and/or concept was satisfactory.

Next, in 718, the student client device 206a may receive an evaluation and/or a recommendation from the computing environment 203 based on the user input data 248. The evaluation may comprise, for example, a score that a student user 103 receives upon completion of an education module 227, a percentage of problems that a user answers correctly, comments from the administrator, and/or a graphic representation of the problems in an education module 227 that a student user 103 answers correctly and incorrectly. Then, in 721, the evaluation and recommendation may be rendered in a user interface 272a, to be viewed by the student user 103.

Figure 8:
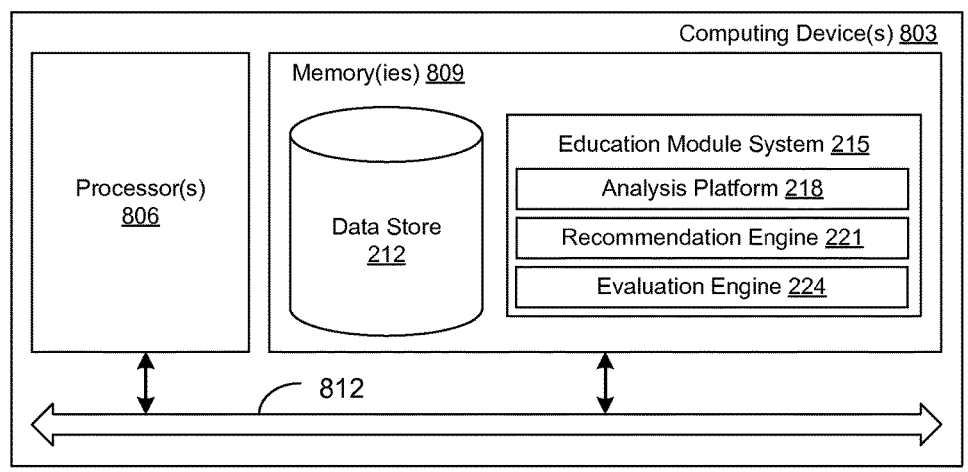
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 (FIG. 2) according to an embodiment of the present disclosure. The computing environment 203 includes one or more computing devices 803. Each computing device 803 includes at least one processor circuit, for example, having a processor 806 and a memory 809, both of which are coupled to a local interface 812. To this end, each computing device 803 may comprise, for example, at least one server computer or like device. The local interface 812 may comprise, for example, a data bus with an accompanying address/control bus or other bus structure as can be appreciated.

Stored in the memory 809 are both data and several components that are executable by the processor 806. In particular, stored in the memory 809 and executable by the processor 806 are analysis platform 218, recommendation engine 221, evaluation engine 224, and potentially other applications. Also stored in the memory 809 may be a data store 212 and other data. In addition, an operating system may be stored in the memory 809 and executable by the processor 806.

It is understood that there may be other applications that are stored in the memory 809 and are executable by the processor 806 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

Although analysis platform 218, recommendation engine 221, evaluation engine 224, and potentially other applications, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5, 6, and 7 show the functionality and operation of an implementation of portions of the education module system 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 5, 6, and 7 show a specific order of execution, it is understood that the order of execution may differ from that which is depicted. For example, the order of execution of two or more blocks may be scrambled relative to the order shown. Also, two or more blocks shown in succession in FIGS. 5, 6, and 7 may be executed concurrently or with partial concurrence. Further, in some embodiments, one or more of the blocks shown in FIGS. 5, 6, and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including analysis platform 218, recommendation engine 221, evaluation engine 224, and potentially other applications, that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including analysis platform 218, recommendation engine 221, evaluation engine 224, and potentially other applications, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, wherein, when executed, the program causes the at least one computing device to at least:

access, in response to a request by at least one of a plurality of users, at least one of a plurality of predefined education modules from memory configured to facilitate an interaction between a respective one of the users and at least one user interface to assist the respective one of the users in a development of a respective skill, the at least one of a plurality of predefined education modules comprising a problem set and at least one model answer, the problem set comprising at least two of: a multiple choice question, a fill-in-the-blank question, an essay question, and a compiling a correct sequence of events question, the at least one of the plurality of predefined education modules further comprising user interface data and at least one of a video tutorial or an interactive video module;

send the at least one user interface to at least one of a plurality of client devices operated by the respective one of the users to be rendered in the client device, wherein the at least one user interface is configured to obtain user input data in real-time by measuring the interaction between the respective one of the users and the at least one user interface, the user input data comprising at least two responses to at least two problems in the problem set, the at least two responses pertaining to the development of the respective skill, the at least one user interface further configured to present the user interface data along with the at least one of the video tutorial or the interactive video module;

send, in response to accessing the user input data in real-time, the at least one model answer, and the user input data comprising at least two responses to an administrative client device to be rendered in an administrative user interface, the administrative user interface being configured to switch among a plurality of interactions for each of the users to view the user input data for each of the users in real-time and to provide real-time feedback to each of the users;

generate a plurality of metrics for each of a plurality of skills, the plurality of metrics being determined based at least in part on the user input data, wherein the metrics describe the development of the respective skill over a period of time, the plurality of metrics being further determined by at least comparing at least one of the at least two responses to the model answer;

access a visualization region comprising at least a heat map generated by an analysis platform, wherein the heat map visually depicts the plurality of metrics, each of the plurality of metrics being determined according to a performance of the respective one of the users identified via the user input data, wherein each of the plurality of skills correspond to a respective portion of the heat map;

send the heat map to the administrative client device to be rendered in the administrative user interface;

provide a recommendation to at least one of the plurality of client devices for accessing a second predefined education module, the recommendation being determined based at least in part on the plurality of metrics;

receive and store additional user input data on the at least one computing device sent by another one of the plurality of client devices via an application programming interface (API), wherein the additional user input data comprises at least two responses to at least two problems in the problem set;

generate an updated heat map and send the updated heat map to the administrative client device to be rendered in the administrative user interface; and cause the administrative client device to render the updated heat map without requiring a refreshing of the administrative user interface using Asynchronous JavaScript and eXtensible markup language (AJAX).

2. The non-transitory computer-readable medium of claim 1, wherein the at least one predefined education module is further configured to assist a student in learning problem solving techniques related to a scientific method.

3. The non-transitory computer-readable medium of claim 1, wherein the heat map further comprises the plurality of metrics in the respective portion of the heat map corresponding to a respective one of the plurality of skills.

4. The non-transitory computer-readable medium of claim 3, wherein one of the plurality of metrics corresponds to an amount of time the respective one of the users spends on the predefined education module.

5. The non-transitory computer-readable medium of claim 3, wherein each of the respective portions of the heat map corresponding to a respective one of the plurality of skills are visually depicted by a color, the color being determined according to the performance using the user input data.

6. A system, comprising:
at least one computing device; and
at least one application executable in the at least one computing device, wherein, when executed, the at least one application causes the at least one computing device to at least:
access, in response to a request by at least one of a plurality of users, at least one of a plurality of predefined education modules from a memory configured to facilitate an interaction between a respective one of the users and at least one user interface, the at least one of a plurality of predefined education modules comprising a problem set and at least one model answer, the problem set comprising at least two of: a multiple choice question, a fill-in-the-blank question, an essay question, and a compiling a correct sequence of events question, the at least one of the plurality of predefined education modules further comprising user interface data and at least one of a video tutorial or an interactive video module;
send the at least one user interface to at least one of a plurality of client devices operated by the respective one of the users to be rendered in the client device, wherein the at least one user interface is configured to provide the at least one application with user input data in real-time by measuring the interaction between the respective one of the users and the at least one user interface, the user input data comprising at least two responses to at least two problems in the problem set, the at least two responses pertaining to a development of a respective skill, the at least one user interface further configured to present the user interface data along with the at least one of the video tutorial or the interactive video module;
send the at least two responses, the at least one model answer, and the user input data to an analysis platform, the analysis platform being configured to collate the user input data in real-time;
send the user input data to an administrative client device to be rendered in an administrative user interface, the administrative user interface being configured to switch among a plurality of interactions for each of the users to view the user input data for each of the users in real-time and to provide real-time feedback to each of the users;
facilitate a real-time evaluation of the user input data in the administrative user interface;
receive and store additional user input data sent by another one of the at least one of a plurality of client devices to an application programming interface on the at least one computing device, wherein the additional user input data comprises at least two responses to at least two problems in the problem set;
generate an updated heat map and send the updated heat map to the administrative client device to be rendered in the administrative user interface; and
cause the administrative client device to render the updated heat map without requiring a refreshing of the administrative user interface using Asynchronous JavaScript and eXtensible markup language (AJAX).

7. The system of claim 6, further comprising:
generate a plurality of metrics for each of a plurality of skills, the plurality of metrics being determined based at least in part on the user input data, wherein the plurality of metrics describe a development of a respective skill over a period of time, the plurality of metrics being further determined by at least comparing at least one of the at least two responses to the model answer.

8. The system of claim 7, further comprising:
access a visualization region comprising at least a heat map generated by the analysis platform, wherein the heat map visually depicts the plurality of metrics, each of the plurality of metrics being determined according to a performance of the respective one of the users identified via the user input data, wherein each of the plurality of metrics correspond to a respective portion of the heat map.

9. The system of claim 8, wherein the heat map further comprises the plurality of metrics in the respective portion of the heat map corresponding to a respective one of the plurality of skills.

10. The system of claim 8, further comprising:
send the heat map to the administrative client device to be rendered in the administrative user interface.

11. The system of claim 8, further comprising:
provide, via the analysis platform, a recommendation for accessing a second predefined education module, the recommendation being determined at least by the plurality of metrics.

12. The system of claim 6, wherein the real-time evaluation of the user input data comprises an administrator input.

13. A method comprising:
accessing, by at least one computing device, in response to a request by a user, one of a plurality of predefined education modules from memory, the predefined education module being configured to facilitate interaction between the user and at least one user interface, the at least one of a plurality of predefined education modules comprising a problem set and at least one model answer, the problem set comprising at least two of: a multiple choice question, a fill-in-the-blank question, an essay question, and a compiling a correct sequence of events question, the at least one of the plurality of predefined education modules further comprising user interface data and at least one of a video tutorial or an interactive video module;
sending the at least one user interface to a client device operated by the respective user to be rendered in the client device, the at least one user interface further configured to present the user interface data along with the at least one of the video tutorial or the interactive video module;
receiving and storing, by the at least one computing device, user input data obtained via the at least one user interface rendered in the client device, the user input data comprising at least two responses to at least two problems in the problem set, the at least two responses pertaining to a development of a respective skill;
generating, by an analysis platform, a plurality of metrics for each of a plurality of skills, the plurality of metrics being determined based at least in part on the user input data, wherein the plurality of metrics describe a development of a respective skill over a period of time, the plurality of metrics being further determined at least by comparing one of the at least two responses to the model answer;
accessing, by a second client device, a visualization region comprising at least a heat map generated by the analysis platform, wherein the heat map visually depicts a plurality of skills, each of the plurality of skills being determined according to a performance of the user identified via the user input data, wherein each of the plurality of metrics correspond to a respective portion of the heat map;

sending, by the at least one computing device, the heat map to the second client device to be rendered in an administrative user interface;

providing a recommendation to at least one of the client device or the second client device for accessing a second predefined education module on the at least one computing device, the recommendation being determined based at least in part on the plurality of metrics, wherein the recommendation for accessing a second predefined education module on the at least one computing device is further based on applying, by the analysis platform, at least one weight sent by the administrative user interface to the plurality of metrics;

sending, from the second client device to the at least one computing device, an evaluation of the user input data, the evaluation being determined at least by the metrics;

receiving and storing, by the at least one computing device, additional user input data sent by a third client device to an application programming interface on the at least one computing device, wherein the additional user input data comprises at least two responses to at least two problems in the problem set;

generating an updated heat map and sending, by the at least one computing device, the updated heat map to the second client device to be rendered in the administrative user interface; and causing the second client device to render the updated heat map without requiring a refreshing of the administrative user interface using Asynchronous JavaScript and eXtensible markup language (AJAX).

14. The method of claim 13, wherein the at least one user interface is configured to provide the analysis platform the user input data in real-time by measuring the interaction between the user and the at least one user interface.

15. The method of claim 13, wherein the administrative user interface is configured to switch between interactions among a plurality of users to view the user input data for each of the plurality of users in real-time and to provide real-time feedback to each of the plurality of users.

16. The method of claim 13, wherein the problem set comprises the at least two of the multiple choice question and the compiling a correct sequence of events question, the at least two responses comprising an answer to the multiple choice question and an answer to the compiling the correct sequence of events question.

17. The method of claim 13, wherein the problem set comprises the at least two of the multiple choice question and the essay question, and the at least two responses comprise an answer to the multiple choice question and an answer to the essay question.

18. The method of claim 13, wherein each of the respective portions of the heat map corresponding to a respective one of the plurality of skills are visually depicted by a color, the color being determined according to the performance using the user input data.

* * * * *